United States Patent
Bates et al.

(10) Patent No.: US 9,740,588 B2
(45) Date of Patent: Aug. 22, 2017

(54) PERFORMANCE ENHANCEMENT MODE SELECTION TOOL

(71) Applicant: International Business Machines Corporation, Armonk, NY (US)

(72) Inventors: Cary L. Bates, Rochester, MN (US); Lee N. Helgeson, Rochester, MN (US); Justin K. King, Rochester, MN (US); Michelle A. Schlicht, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/721,080

(22) Filed: May 26, 2015

(65) Prior Publication Data

US 2016/0350200 A1 Dec. 1, 2016

(51) Int. Cl.
*G06F 11/34* (2006.01)

(52) U.S. Cl.
CPC ...... *G06F 11/3476* (2013.01); *G06F 2201/86* (2013.01); *G06F 2201/865* (2013.01)

(58) Field of Classification Search
CPC ............ G06F 11/3636; G06F 11/3644; G06F 11/3476; G06F 2201/86; G06F 2201/865
See application file for complete search history.

(56) References Cited

U.S. PATENT DOCUMENTS

| | | | |
|---|---|---|---|
| 7,647,585 B2 | 1/2010 | Sun | |
| 7,698,534 B2 | 4/2010 | Perfetta et al. | |
| 8,307,345 B2 * | 11/2012 | Sunkara | G06F 11/3466 717/130 |
| 8,473,925 B2 * | 6/2013 | Gagliardi | G06F 11/3644 714/35 |
| 8,627,305 B1 | 1/2014 | Dalcher et al. | |
| 8,752,023 B2 | 6/2014 | Golan et al. | |
| 8,899,343 B2 | 12/2014 | Bates et al. | |
| 8,938,729 B2 * | 1/2015 | Martin | G06F 11/3466 717/130 |
| 2010/0115495 A1 * | 5/2010 | Sunkara | G06F 11/3466 717/130 |

(Continued)

OTHER PUBLICATIONS

Ehlers, et al., "Self-Adaptive Software Performance Monitoring", Software Engineering Group, Christian-Albrechts-University Kiel. 2011. pp. 51-62.

(Continued)

*Primary Examiner* — Emerson Puente
*Assistant Examiner* — Erika Kretzmer
(74) *Attorney, Agent, or Firm* — Jay Wahlquist

(57) ABSTRACT

A computer-implemented method of reducing impact of performance data gathering on execution of instrumented code comprises gathering respective performance data for each of a plurality of routines in the instrumented code over a plurality of execution instances of the instrumented code. The method also comprises determining that the gathered performance data for the at least one selected routine follows an identified pattern for at least one selected routine from the plurality of routines and, in response to determining that the at least one selected routine follows an identified pattern, removing instrumentation associated with the at least one selected routine.

11 Claims, 4 Drawing Sheets

(56) References Cited

U.S. PATENT DOCUMENTS

| 2011/0283263 A1* | 11/2011 | Gagliardi | G06F 11/3644 |
| | | | 717/130 |
| 2012/0089966 A1* | 4/2012 | Martin | G06F 11/3466 |
| | | | 717/133 |
| 2013/0104108 A1 | 4/2013 | Bates et al. | |
| 2014/0229916 A1 | 8/2014 | Bates et al. | |

OTHER PUBLICATIONS

Kessler, "Fast Breakpoints: Design and Implementation", Proceedings of the ACM SIGPLAN'90 Conference on Programming Language Design and Implementation. White Plains, New York, Jun. 20-22, 1990. pp. 78-84.

Tikir, et al., "Efficient Instrumentation for Code Coverage Testing", Computer Science Department, University of Maryland. 11 pages. 2002 http://users.sdsc.edu/~mtikir/publications/papers/issta02.pdf.

Unknown, "The Case for Adaptive Instrumentation in J2EE Environments", Precise, White Paper Application Performance Management. 10 pages. Copyright © 2009 Precise Software Solutions, Inc.

* cited by examiner

| Breakpoint Table | | | 210 |
|---|---|---|---|
| BP# | Address | Original Op Code | |
| 1 | 0x7982625 | Op Code 1 | 220A |
| 2 | 0x7982718 | Op Code 2 | 220B |
| ⋮ | ⋮ | ⋮ | |
| N | 0x8075322 | Op Code N | 220N |

FIG. 2

Instrumented Code — 122

| Address | Op Code |
|---|---|
| ⋮ | ⋮ |
| 0x7982625 | BP Jump | — 320A
| ⋮ | ⋮ |
| 0x7982718 | BP Jump | — 320B
| ⋮ | ⋮ |
| 0x8075322 | BP Jump | — 320N
| ⋮ | ⋮ |

FIG. 3

PERFORMANCE ENHANCEMENT MODE SELECTION TOOL

BACKGROUND

Computer systems typically include a combination of computer programs and hardware, such as semiconductors, transistors, chips, circuit boards, storage devices, and processors. The computer programs are stored in the storage devices and are executed by the processors. In developing or testing a program, it can be desirable to measure or track the performance of the program and/or components of the program.

SUMMARY

In one embodiment, a computer-implemented method of reducing impact of performance data gathering on execution of instrumented code is provided. The method comprises gathering respective performance data for each of a plurality of routines in the instrumented code over a plurality of execution instances of the instrumented code. The method also comprises determining that the gathered performance data for the at least one selected routine follows an identified pattern for at least one selected routine from the plurality of routines and, in response to determining that the at least one selected routine follows an identified pattern, removing instrumentation associated with the at least one selected routine.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 2 depicts one embodiment of an example breakpoint table.

FIG. 3 depicts one embodiment of an example instrumented code.

Figure 1:
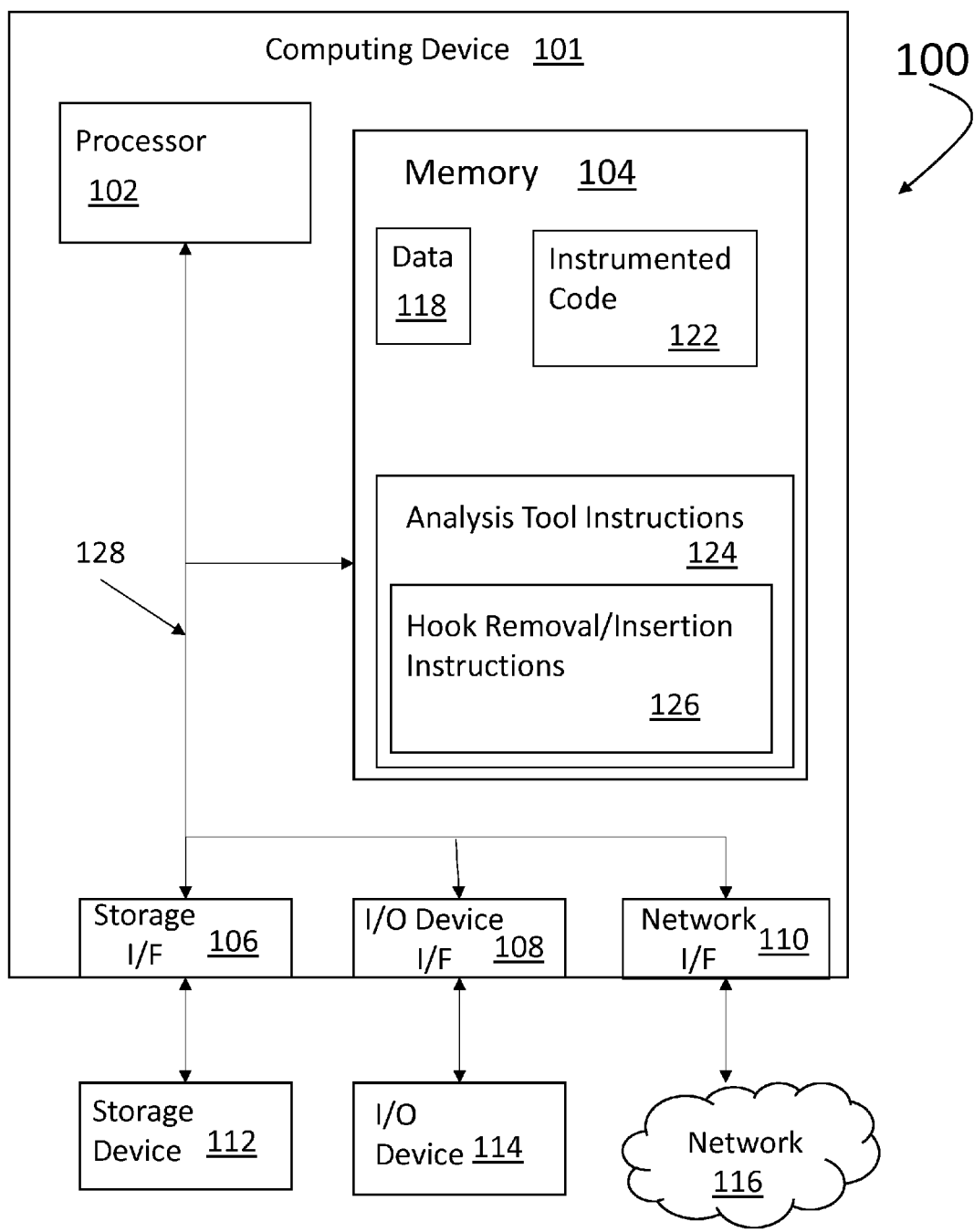
FIG. 1 is a high level block diagram of one embodiment of an illustrative computer system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

The embodiments described below enable measurement of a program's performance while reducing the impact on program execution due to the performance measurement. In particular, the embodiments described herein enable the adding and removing of hooks from the program based on detected patterns in the measured performance of respective portions of the program to thereby improve the execution time of the program being measured, as described in more detail below.

One technique for measuring or gathering performance data is referred to as "sampling." As understood by one of skill in the art, sampling includes taking a random sample of the program at different points in time as the program executes to determine how much time is spent on executing each routine or component of the program. As used herein, the term "routine" refers to a line instruction, a segment of the program or code, and/or an op code, etc. For purposes of illustration, Table 1 depicts example measurements from an illustrative program having a main function and six sub-functions. The illustrative example in Table 1 indicates that sub-functions 1 and 4 are called from the main function and that functions 1 and 4 each call further sub-functions. In particular, in this example, Function 1 further calls functions 2, 3, and 6 while function 4 further calls functions 2, 3, and 5. It is to be understood that Table 1 is provided by way of illustration only and is not to be taken in a limiting sense either with respect to the structure of the program or the illustrative measured values for each function.

TABLE 1

| Program Component | % Execution Time |
| --- | --- |
| Main | 1% |
| Function 1 | 5% |
| Function 2 | 75% |
| Function 3 | 10% |
| Function 6 | 1% |
| Function 4 | 3% |
| Function 2 | 75% |
| Function 3 | 10% |
| Function 5 | 5% |

As can be seen in Table 1, sampling gathers execution time for a given function, but does not reflect cumulative performance data. Cumulative performance data refers to the performance for a given function and additional functions called from within the given function, such as the amount of time for a given function to execute including the cumulative time of additional functions called by the given function. For example, function 1 calls functions 2, 3, and 6. Thus, the cumulative execution time for function 1 includes the portions of execution time for functions 2, 3, and 6 due to calls to those functions from within function 1.

Another technique for gathering performance data is referred to herein as a "cumulative" technique which enables the gathering of cumulative performance data. In the cumulative technique, hooks are inserted into the program to gather performance data. As known to one of skill in the art, "hooks" include code that intercepts calls, events, or messages passed by the program being evaluated. Hooks can also be referred to herein as "instrumentation". Hooks can enable gathering performance data, as known to one of skill in the art. An example of the results of the cumulative technique for the illustrative program discussed above is shown in Table 2.

TABLE 2

| Program Component | % Execution Time |
| --- | --- |
| Main | 100% |
| Function 1 | 20% |

TABLE 2-continued

| Program Component | % Execution Time |
|---|---|
| Function 2 | 75% |
| Function 3 | 10% |
| Function 6 | 1% |
| Function 4 | 79% |
| Function 2 | 75% |
| Function 3 | 10% |
| Function 5 | 5% |

As shown in Table 2, the cumulative technique credits execution time to both the function called and its parent. However, one instance of each function receives the credit even if the same routine is called from multiple parent functions. For example, Function 2 is called from within both Function 1 and Function 4. In the above example, the results do not depict how much execution time for Function 2 is due to the call from Function 1 and how much is a result of the call from within Function 4.

Another approach for measuring performance instruments the program or code by putting hooks or instrumentation on each block of the program or code. Hence, as used herein, the term instrumented code refers to a code having one or more hooks inserted into the code. Information about the instructions executed (e.g. the instruction number in the line, clock cycles needed to execute each of instructions, etc.) and information about the time taken from any calls that are made from within the block are used to determine the amount of time spent on each line for a particular point in the call tree. One tool capable of implementing this approach is the Rational® PurifyPlus™ solution by UNICOM®. However, it is to be understood that other debugging and run-time analysis tools can also be used. Table 3 depicts illustrative results for the example program depicted in Tables 1 and 2.

TABLE 3

| Program Component | % Execution Time |
|---|---|
| Main | 100% |
| Function 1 | 20% |
| Function 2 | 10% |
| Function 3 | 4% |
| Function 6 | 1% |
| Function 4 | 79% |
| Function 2 | 65% |
| Function 3 | 6% |
| Function 5 | 5% |

As can be seen in Table 3, the results depict the cumulative totals as well as allocate the measured values for each function according to the parent function from which it was called. For example, rather than showing Function 2 at 75% both when called from within Function 1 as well as when called from within Function 4, as in Table 2, Table 3 indicates that the execution time credited to Function 2 when called from within Function 1 is 10% and the execution time credited to Function 2 when called from within Function 4 is 65%. Hence, if a user wants to focus on making the program faster by focusing on Function 4, they can see the times associated with the calls that contributed to the execution time of Function 4 rather than the overall execution time for all instances of the given function.

Although putting hooks on each basic block of the code is more efficient than placing a hook on every line, it can still be invasive and have a noticeable impact on program execution time. Hence, the embodiments described herein reduce the impact on program execution time by determining when to remove and insert hooks based on detected patterns in program execution times, as described in more detail below. The embodiments described herein can be implemented by a computing device having at least one programmable processor which includes or functions with software programs, firmware or other computer readable instructions for carrying out various methods, process tasks, calculations, and control functions, used in the determining when to remove and insert hooks.

For example, FIG. 1 is a high level block diagram of one embodiment of an illustrative computer system 100 having a computing device 101 configured to determine when to remove and insert hooks. In the embodiment shown in FIG. 1, the computing device 101 comprises one or more processors 102, a memory or storage medium 104, a storage interface 106, an Input/Output (I/O) device interface 108, and a network interface 110. In this example, these system components are interconnected through the use of a system bus 128. The storage interface 106 is used to connect storage devices, such as one or more disk drives or direct access storage devices 112, to computing device 101. One specific type of direct access storage device 112 is a readable and writable compact disc (CD-RW) drive, which may store data to and read data from a CD-RW. Other types of direct access storage devices include, but are not limited to, rotating magnetic disk drive storage devices, and arrays of disk drives configured to appear as a single large storage device to a host computer. Additionally, the contents of memory 104, or a portion thereof, may be stored to and retrieved from the storage device 112 as needed.

In this example, the memory 104 stores or encodes data 118, instrumented code 122, and analysis tool instructions 124, collectively referred to herein as "memory elements." In some embodiments, the memory 104 includes a random-access semiconductor memory, storage device, or storage medium (either volatile or non-volatile) for storing or encoding data and programs. In another embodiment, the memory 104 may represent the entire virtual memory of the computing device 101, and may also include the virtual memory of other computer systems coupled to the computing device 101 or connected via the network 116. The memory 104 may be conceptually a single monolithic entity in this example, but in other embodiments the memory 104 includes a more complex arrangement, such as a hierarchy of caches and other memory devices.

It is to be understood that, in some embodiments, the computing device 101 can utilize well known virtual addressing mechanisms that allow the programs executed by the computing device 101 to behave as if they have access to a large, single storage entity instead of access to multiple, smaller storage entities. Therefore, while data 118, instrumented code 122 and analysis tool instructions 124 are depicted as residing in the same memory 104 in this example, those skilled in the art will recognize that the memory elements are not necessarily all completely contained in memory 104 at the same time. For example, in other embodiments, some or all of the memory elements may be on different computer systems and may be accessed remotely, e.g., via the network 116.

Data 118 represents any data that serves as input to or output from any program in computer system 100. The instrumented code 122 is any code that is being analyzed for performance gathering, whether the code is a complete application, a module, or some subset of an application or module. As used herein, the term instrumented code refers to code into which hooks have been placed for purposes of debugging and/or performance measurements, as understood by one of skill in the art.

The processor 102 executes instructions or statements stored in the memory 104 and may include one or more levels of on-board cache. For example, the processor 102 is configured to execute the analysis tool instructions 124 to carry out various functions described herein. The processor 102 may be constructed from one or more microprocessors and/or integrated circuits. For example, the processor 102 may contain multiple processing units and/or multi-core processing units in some embodiments. However, in other embodiments processor 102 may contain one single core processing unit. Although the computing device 101 is shown to include a single processor 102 and a single system bus 128, those skilled in the art will appreciate that multiple processing units and/or multiple buses can be used in other embodiments. In addition, in other embodiments, one or more of the functions described herein may be implemented in hardware via semiconductor devices, chips, logical gates, circuits, circuit cards, other physical hardware devices, or a combination of these devices in lieu of, or in addition to, a processor-based system. Furthermore, in some embodiments the interfaces 106, 108, and 110 may each include separate programmed microprocessors that are used to off-load computationally-intensive processing from processor 102 in some embodiments. Additionally, those skilled in the art will appreciate that the functions of the interfaces 106, 108, and 110 may also be performed using Input/Output (I/O) adapters.

The I/O device interface 108 is configured to directly connect one or more I/O devices 114 to the computing device 101. The I/O device 114 can include user output devices (such as a video display device, speaker, or television set) and/or user input devices (such as a keyboard, mouse, keypad, touchpad, trackball, buttons, light pen, or other pointing device). A user may manipulate the user input devices using a user interface, in order to provide input data and commands to the user I/O device 114 and the computing device 101, and may receive output data via the user output devices. For example, a user interface may be presented via the user I/O device 114, such as displayed on a display device, played via a speaker, or printed via a printer. It is to be noted, however, that while I/O device interface 108 is provided to support communication with one or more I/O devices 114 in this example, computer system 100 does not necessarily require an I/O device interface 108 or an I/O device 114. For example, in some embodiments, the I/O device 114 and I/O device interface 108 are omitted and all interaction with users and other processes occurs via network interface 110.

The network interface 110 is used to connect the computing device 101 to other computer systems or workstations via network 116. The network interface 110 broadly represents any suitable way to interconnect electronic devices. In this example, the network interface 110 includes a combination of hardware and software that allow communicating on the network 116. Software in the network interface 110 can include a communication manager that manages communication with other computer systems via network 116 using a suitable network protocol. Many different network protocols can be used to implement a network, as understood by one of skill in the art. One example of such a protocol is the well-known TCP/IP (Transmission Control Protocol/Internet Protocol) which can be used by the communication manager within the network interface 110 in some embodiments As discussed above, the processor 102 executes the analysis tool instructions 124 which include the hook removal/insertion instructions 126. The hook removal/insertion instructions 126 are configured to cause the processor 102 to determine when to remove and insert hooks into the instrumented code 122 based on detected patterns in the execution of the instrumented code 122. In particular, the hook removal/insertion instructions 126 cause the processor 102 to analyze data gathered from respective hooks to identify respective patterns in the execution time of the line or routing of the instrumented code 122 associated with the respective hooks. After determining that a given routine or function follows an identified pattern, the hook removal/insertion instructions 126 cause the processor 102 to temporarily halt execution of the instrumented code 122 to remove the hook associated with the given routine or function. If the processor 102 determines later that the given routine or function is no longer following the identified pattern, the hook removal/insertion instructions 126 cause the processor to temporarily halt execution of the instrumented code 122 to reinsert the hook associated with the given routine or function.

Referring to FIG. 2, a breakpoint table 210 represents one suitable way for the analysis tool instructions 124 to track breakpoints. The breakpoint table 210 includes multiple entries, shown in FIG. 2 as 220A . . . 220N, wherein N is the total number of entries. Each entry 220 in the breakpoint table 210 corresponds to a breakpoint in the instrumented code 122. For example, entry 220A shows breakpoint #1 corresponds to address 0x7982625, with the original instruction (i.e., op code) of Op Code 1. When breakpoint #1 is set, Op Code 1 is copied from the program, and the original op code is replaced with a jump instruction, as is known in the art. A jump instruction (also referred to herein as a breakpoint jump or BP jump) is a branch to an auxiliary code which includes the respective original op code as well as code for gathering performance data, such as, but not limited to recording start and stop times for execution of the auxiliary code.

The inclusion of jump instructions in the instrumented code 122 is depicted in FIG. 3. As can be seen in FIG. 3, the instrumented code 122 includes addresses and corresponding instructions in the form of op codes. When breakpoint #1 is set, the entry 220A in the breakpoint table 210 is created, with the original op code Op Code 1 being written from the instrumented code 122 to the entry 220A. The Op Code 1 in the program at that location in the instrumented code 122 is overwritten with a jump instruction, as shown at 320A in FIG. 3. In similar fashion, breakpoint #2 shown as entry 220B in FIG. 2 specifies the address of the respective breakpoint, along with the original op code Op Code 2 that was in the instrumented code 122. The original Op Code 2 at address 0x7982718 is replaced with the jump instruction, as shown at 320B in FIG. 3. Breakpoint #N shown as entry 220N in FIG. 2 specifies the address of the respective breakpoint, along with the original op code Op Code N that was in the instrumented code 122. The original Op Code N at address 0x8075322 is replaced with the jump instruction, as shown at 320N in FIG. 3.

After the hook removal/insertion instructions 126, executed by the processor 102, determines that the execution of a given routine (e.g. line instruction, op code, etc.) in the instrumented code 122 follows an expected or identified pattern for the given routine, the hook removal/insertion instructions 126 are configured to cause the processor 102 to pause execution of the instrumented code 122 to remove the respective jump instruction and reinsert the respective original op code for that address, as discussed above. In some embodiments, the pattern is based on the execution time of the given routine. For example, the instrumented code 122 can be run a plurality of times (e.g. on the order of hundreds of times in some embodiments) to establish a respective baseline for the expected pattern of each routine. In particular, a respective pattern is established for the execution time of a given routine if each time that the given routine is run or executed is within some predetermined boundary or limit.

For example, the boundary can be a statistical deviation, such as, but not limited to, 1 standard deviation from a statistical mean execution time for the given routine. Hence, in such embodiments, if the execution time of each instance of running the given routine is within 1 standard deviation then a pattern has been established. In other embodiments, the boundary can be based on a predetermined difference threshold (e.g. a given number of microseconds) for differences in execution time between execution instances of the given routine. For example, if the difference between the execution times of any two instances of executing the given routine is less than the predetermined difference threshold, then the respective pattern has been established or identified. Alternatively, the difference threshold can be compared to the difference between the execution time of each instance of executing the given routine and an average execution time to establish the respective pattern.

After a pattern has been identified or established for the given routine, the hook removal/insertion instructions 126 cause the processor 102 to remove the hook associated with the given routine, as discussed above. For example, in some embodiments, the hook removal/insertion instructions 126 cause the processor 102 to remove the associated hook upon identification or establishment of the pattern for the given routine. In other embodiments, the hook removal/insertion instructions 126 cause the processor 102 to remove the associated hook after comparing a predetermined number of execution instances to the identified pattern. If the predetermined number of execution instances continues to follow or adhere to the identified pattern, then the hook removal/insertion instructions 126 cause the processor 102 to remove the associated hook, as discussed above.

Additionally, in some embodiments, the hook removal/insertion instructions 126 cause the processor to reinsert the removed hook if there is an indication that the given routine has ceased following or adhering to the identified pattern. For example, the overall time taken by the routine can be analyzed to determine if it is consistent with the pattern. In addition, the point in time in which another routine or system service is called/run can be analyzed to determine if it is consistent with past behavior. Additionally, the amount of time taken to run the called routine can be analyzed to determine if it is consistent with previous execution instances.

In some embodiments, the hook removal/insertion instructions 126 can determine if the given routine is no longer following the identified pattern, based on data gathered regarding a higher level routine. As used herein, the term "higher level routine" refers to a routine which calls another routine. For example, in the illustrative embodiment shown in Tables 1-3, function 1 calls functions 2, 3, and 6. Hence, function 1 is a higher level routine than functions 2, 3, and 6. If a hook is removed from one or more of functions 2, 3, and 6, the hook removal/insertion instructions 126 can continue to gather performance data regarding function 1 using a hook associated with function 1. If the performance of function 1 changes unexpectedly, such as an increased execution time for function 1, then the hook removal/insertion instructions 126 cause the processor 102 to reinsert the removed hooks to determine which, if any, of the functions 2, 3, and 6 are no longer following its respective pattern. For example, in some embodiments, the processor 102 reinserts all of the removed hooks at approximately the same time. In other embodiments, the hook removal/insertion instructions 126 cause the processor 102 to reinsert the hooks one at a time, allowing for analysis of data gathered from each reinserted hook before reinserting another hook. In some embodiments having multiple levels of routines, the hooks are removed from lowest level to highest level. Additionally, in some such embodiments, hooks are reinserted from highest level to lowest level.

Another technique for determining whether a given routine is adhering to an identified pattern after the respective hook has been removed is to perform periodic sampling. Hence, in some embodiments, the hook removal/insertion instructions 126 cause the processor 102 to periodically sample the performance of the given routine using techniques discussed generally above and known to one of skill in the art. If the sampling results indicate that a given routine is no longer adhering to the identified pattern, then the hook removal/insertion instructions 126 cause the processor 102 to pause execution of the instrumented code 122 in order to reinsert the associated hook.

In some embodiments, the hook removal/insertion instructions 126 are configured to determine or identify a new pattern after reinserting the hook into the instrumented code 122. For example, if a hook is reinserted, the hook removal/insertion instructions 126 use techniques discussed above to analyze a plurality of execution instances to determine if the given routine is following a new pattern of execution. If a new pattern is established, the hook removal/insertion instructions 126 are configured to cause the processor 102 to remove the respective hook after identifying the new pattern using techniques discussed above.

Furthermore, in some embodiments, the hook removal/insertion instructions 126 is configured to remove only hooks which are on a hot path and are determined to follow an identified pattern. As used herein, a hot path is a code path that is executed often in comparison to other code paths. The designation of a hot path can be based on the number of times the given code path is executed within a predetermined time frame, for example. Alternatively, hot paths can be determined as the code paths which take up a given percentage of the total execution time. For example, the code paths which combined take up 80% of the execution time can be designated as hot paths, in some embodiments. It is to be understood that the criteria for determining which code paths are hot paths is dependent on the specific implementation.

By not removing hooks for code paths that are not executed frequently (e.g. not hot paths), detection of execution that does not match an identified pattern can be improved with reduced performance impact. That is, since these code paths are not executed frequently there is less performance impact by leaving in the hooks as opposed to leaving in hooks for hot paths. Additionally, since the hooks do not need to be reinserted, detection of execution that does not follow an identified pattern is quicker and does not require pausing execution to reinsert a hook. In addition, in some embodiments, permanent hooks are used (i.e. hooks that are not eligible to be removed) for sections of code that are long with no calls or loops. Furthermore, in some embodiments, information from previous runs can be used to identify routines that have executed in a consistent manner (e.g. followed an identified pattern). Hence, the information from previous runs is used to determine which routines are to be monitored for hook removal.

Figure 4:
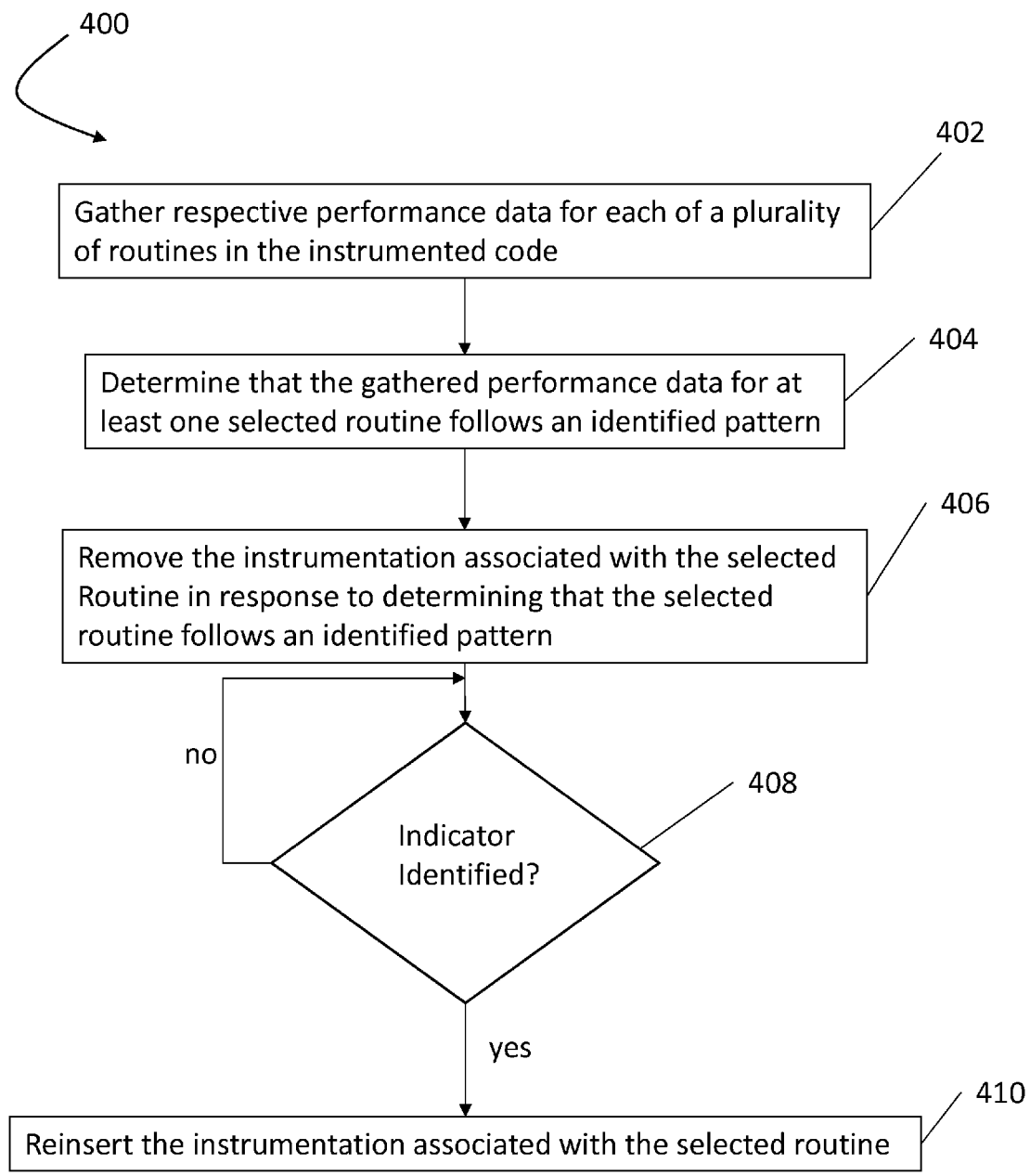
FIG. 4 is a flow chart depicting one embodiment of an illustrative method of reducing the impact of performance data gathering on the execution of instrumented code.

FIG. 4 is a flow chart depicting one embodiment of an illustrative computer-implemented method 400 of reducing the impact of performance data gathering on the execution of instrumented code, such as the example instrumented code 122. Method 400 can be implemented via a processor such as the processor 102 in computing device 101. At block 402, respective performance data for each of a plurality of routines in the instrumented code is gathered by the processor over a plurality of execution instances of the instrumented code. Each execution instance of the instrumented code or routine refers to executing the instrumented code or routine, respectively, one time. The processor can gather the performance data by executing the hooks in the instrumented code and passing the data to another process for data gathering, such as processes associated with the analysis tool instructions and/or hook removal/insertion instructions discussed above. The analysis tool instructions and/or hook removal/insertion instructions receive the passed performance data and cause the processor to perform analysis on the performance data, as discussed herein.

At block 404, the processor determines that the gathered performance data for at least one selected routine follows an identified pattern. In some embodiments, the processor determines that the selected routine follows an identified pattern by determining that each instance of the selected routine is executed within a predetermined limit. For example, as discussed above, the predetermined limit can be a standard deviation from a mean execution time for the selected routine and/or a difference threshold for differences in execution time between execution instances of the selected routine, in some embodiments.

At block 406, the processor removes the instrumentation associated with the selected routine in response to determining that the selected routine follows an identified pattern. For example, in some embodiments, the hook removal/insertion instructions cause the processor to halt execution of the instrumented code and replace a breakpoint jump with the original routine, as discussed above.

At block 408, the processor determines if there is an indicator that the selected routine has ceased following the identified pattern after removing the associated instrumentation. If an indicator has not been identified, then the method 400 loops back to block 408 until the processor identifies one or more indicators that the selected routine has ceased following the identified pattern.

Indicators that the selected routine has ceased following the identified pattern can include, but are not limited to, a change in behavior of a higher level routine associated with the selected routine, a change in the overall time taken by the selected routine to execute, and/or a change in the point in time in which the selected routine calls another routine. For example, if the processor determines that a higher level routine which calls the selected routine begins to take less or more time than normally expected, then that can be an indicator that the selected routine is no longer following the identified pattern. Additionally, if other techniques, such as sampling, indicate that the overall time for the selected routine to execute is inconsistent with the identified pattern, then the processor identifies that changed behavior as an indicator that the selected routine is no longer following the identified pattern. In another example, the processor can identify a change in the time at which the selected routine calls another routine as an indicator that the selected routine has ceased adhering to the identified pattern. The change in time can be identified by comparing the current instance to past behavior of the selected routine.

After an indicator has been identified, the processor reinserts the instrumentation associated with the selected routine into the instrumented code at block 410. For example, as discussed above, the processor can halt execution of the instrumented code, insert a breakpoint jump, and update a breakpoint table.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Example Embodiments

Example 1 includes a computer-implemented method of reducing impact of performance data gathering on execution of instrumented code. The method comprises gathering respective performance data for each of a plurality of routines in the instrumented code over a plurality of execution instances of the instrumented code; for at least one selected routine from the plurality of routines, determining that the gathered performance data for the at least one selected routine follows an identified pattern; and in response to determining that the at least one selected routine follows an identified pattern, removing instrumentation associated with the at least one selected routine.

Example 2 includes the computer-implemented method of Example 1 and further comprises after removing the instrumentation associated with the at least one selected routine, identifying an indicator that the at least one selected routine has ceased following the identified pattern; and in response to identifying the indicator that the at least one selected routine has ceased following the identified pattern, reinserting the instrumentation associated with the at least one selected routine.

Example 3 includes the computer-implemented method of Example 2, wherein identifying the indicator that the at least one selected routine has ceased following the identified pattern comprises determining that behavior of a higher level routine associated with the at least one selected routine has changed.

Example 4 includes the computer-implemented method of any of Examples 2-3, wherein identifying the indicator that the at least one selected routine has ceased following the identified pattern comprises determining that the overall time taken by the at least one selected routine is inconsistent with the identified pattern.

Example 5 includes the computer-implemented method of any of Examples 2-4, wherein identifying the indicator that the at least one selected routine has ceased following the identified pattern comprises comparing a point in time in which another routine is called by the at least one selected routine to past behavior of the at least the one selected routine.

Example 6 includes the computer-implemented method of any of Examples 1-5, wherein determining that the gathered performance data for the at least one selected routine follows an identified pattern comprises determining that each instance of the at least one selected routine is executed within a predetermined limit.

Example 7 includes the computer-implemented method of Example 6, wherein the predetermined limit comprises one of a standard deviation from a mean execution time for the at least one selected routine or a predetermined difference threshold for differences in execution time between execution instances of the at least one selected routine.

Example 8 includes a program product comprising a processor-readable storage medium having program instructions embodied thereon, wherein the program instructions are configured, when executed by at least one programmable processor, to cause the at least one programmable processor to receive respective performance data for each of a plurality of routines in the instrumented code over a plurality of execution instances of the instrumented code; for at least one selected routine from the plurality of routines, to determine that the received performance data for the at least one selected routine follows an identified pattern; and to remove instrumentation associated with the at least one selected routine in response to determining that the at least one selected routine follows an identified pattern.

Example 9 includes the program product of Example 8, wherein the program instructions are further configured to cause the at least one programmable processor to identify an indicator that the at least one selected routine has ceased following the identified pattern after removing the instrumentation associated with the at least one selected routine; and to reinsert the instrumentation associated with the at least one selected routine in response to identifying the indicator that the at least one selected routine has ceased following the identified pattern.

Example 10 includes the program product of Example 9, wherein the program instructions are further configured to cause the at least one programmable processor to identify the indicator that the at least one selected routine has ceased following the identified pattern by causing the at least one programmable processor to determine that behavior of a higher level routine associated with the at least one selected routine has changed.

Example 11 includes the program product of any of Examples 9-10, wherein the program instructions are further configured to cause the at least one programmable processor to identify the indicator that the at least one selected routine has ceased following the identified pattern by causing the at least one programmable processor to determine that the overall time taken by the at least one selected routine is inconsistent with the identified pattern.

Example 12 includes the program product of any of Examples 9-11, wherein the program instructions are further configured to cause the at least one programmable processor to identify the indicator that the at least one selected routine has ceased following the identified pattern by causing the at least one programmable processor to compare a point in time in which another routine is called by the at least one selected routine to past behavior of the at least the one selected routine.

Example 13 includes the program product of any of Examples 9-12, wherein the program instructions are further configured to cause the at least one programmable processor to determine that the received performance data for the at least one selected routine follows an identified pattern by causing the at least one programmable processor to determine that each instance of the at least one selected routine is executed within a predetermined limit.

Example 14 includes the program product of Example 13, wherein the predetermined limit comprises one of a standard deviation from a mean execution time for the at least one selected routine or a predetermined difference threshold for differences in execution time between execution instances of the at least one selected routine.

Example 15 includes an apparatus comprising a storage medium having instrumented code stored thereon, the instrumented code comprising a plurality of routines having respective instrumentation associated with each of the plurality of routines; and a processor coupled to the storage medium and configured to execute the instrumented code. The processor is further configured to determine that performance data for at least one selected routine of the plurality of routines adheres to an identified pattern and to remove the respective instrumentation associated with the at least one selected routine in response to determining that the performance data for the at least one selected routine adheres to the identified pattern.

Example 16 includes the apparatus of Example 15, wherein the processor is further configured to identify an indicator that the at least one selected routine has ceased adhering to the identified pattern after the instrumentation associated with the at least one selected routine is removed and to reinsert the respective instrumentation associated with the at least one selected routine in response to identifying the indicator that the at least one selected routine has ceased adhering to the identified pattern.

Example 17 includes the apparatus of Example 16, wherein the processor is configured to identify the indicator that the at least one selected routine has ceased adhering to the identified pattern by determining that behavior of a higher level routine associated with the at least one selected routine has changed.

Example 18 includes the apparatus of any of Examples 16-17, wherein the processor is configured to identify the indicator that the at least one selected routine has ceased adhering to the identified pattern by determining that the overall time taken by the at least one selected routine is inconsistent with the identified pattern.

Example 19 includes the apparatus of any of Examples 15-18, wherein the processor is configured to determine that the performance data for the at least one selected routine adheres to the identified pattern by determining that each instance of the at least one selected routine is executed within a predetermined limit.

Example 20 includes the apparatus of Example 19, wherein the predetermined limit comprises one of a standard deviation from a mean execution time for the at least one selected routine or a predetermined difference threshold for differences in execution time between execution instances of the at least one selected routine.

Although specific embodiments have been illustrated and described herein, it will be appreciated by those of ordinary skill in the art that any arrangement, which is calculated to achieve the same purpose, may be substituted for the specific embodiments shown.

What is claimed is:

1. A computer-implemented method of reducing impact of performance data gathering on execution of instrumented code, the method comprising:
   gathering respective first performance data for each of a plurality of routines in the instrumented code over a plurality of execution instances of the instrumented code;
   establishing a respective first pattern of execution for at least one selected routine from the plurality of routines based on respective execution times from the respective first performance data of the at least one selected routine over the plurality of execution instances;
   after establishing the respective first pattern of execution for the at least one selected routine from the plurality of routines, gathering respective second performance data for the at least one selected routine from the plurality of routines;
   for the at least one selected routine from the plurality of routines, comparing the respective second performance data to the respective first pattern of execution established based on the respective first performance data for the at least one selected routine to determine whether the respective second performance data for the at least one selected routine follows the respective first pattern of execution for the at least one selected routine;
   in response to determining that the at least one selected routine follows the respective first pattern of execution for the at least one selected routine, removing instrumentation associated with the at least one selected routine;

after removing the instrumentation associated with the at least one selected routine, identifying an indicator that the at least one selected routine has ceased following the respective first pattern of execution, wherein identifying the indicator that the at least one selected routine has ceased following the respective pattern comprises determining that execution time of a higher level routine which calls the at least one selected routine has changed;

in response to identifying the indicator that the at least one selected routine has ceased following the respective first pattern of execution, reinserting the instrumentation associated with the at least one selected routine;

after reinserting the instrumentation associated with the at least one selected routine, gathering respective third performance data for the at least one selected routine over a plurality of execution instances of the instrumented code;

establishing a new respective second pattern of execution for the at least one selected routine based on respective execution times from the respective third performance data of the at least one selected routine after reinserting the instrumentation associated with the at least one selected routine;

after establishing the respective second pattern of execution for the at least one selected routine from the plurality of routines, gathering respective fourth performance data for the at least one selected routine from the plurality of routines;

for the at least one selected routine from the plurality of routines, comparing the respective fourth performance data to the respective second pattern of execution established based on the respective third performance data for the at least one selected routine to determine whether the respective fourth performance data for the at least one selected routine follows the respective second pattern of execution for the at least one selected routine; and in response to determining that the at least one selected routine follows the respective second pattern of execution for the at least one selected routine, removing instrumentation associated with the at least one selected routine.

2. The computer implemented method of claim 1, wherein identifying the indicator that the at least one selected routine has ceased following the respective pattern comprises comparing a point in time in which another routine is called by the at least one selected routine to past behavior of the at least the one selected routine.

3. The computer-implemented method of claim 1, wherein establishing the respective pattern for the at least one selected routine comprises:
   computing a mean execution time for the at least one selected routine based on the plurality of execution instances;
   determining a respective difference between the mean execution time and each respective execution time of the at least one selected routine corresponding to each execution instance; and
   establishing the respective pattern based on the mean execution time in response to determining that each respective difference is less than a difference threshold.

4. The computer-implemented method of claim 1, wherein removing instrumentation associated with the at least one selected routine comprises removing the instrumentation only if the at least one selected routine is on a code path which meets a predetermined execution criteria for designation as a hot path.

5. A program product comprising a non-transitory processor-readable storage medium having program instructions embodied thereon, wherein the program instructions are configured, when executed by at least one programmable processor, to cause the at least one programmable processor to:

receive respective first performance data for each of a plurality of routines in an instrumented code over a plurality of execution instances of the instrumented code;

establish a respective first pattern of execution for at least one selected routine from the plurality of routines based on respective execution times from the respective first performance data of the at least one selected routine over the plurality of execution instances;

receiving respective second performance data for the at least one selected routine after establishing the respective first pattern of execution for the at least one selected routine;

for the at least one selected routine from the plurality of routines, compare the respective second performance data to the respective first pattern of execution to determine that the received respective second performance data for the at least one selected routine follows the respective first pattern of execution; and remove instrumentation associated with the at least one selected routine in response to determining that the at least one selected routine follows the respective first pattern of execution for the at least one selected routine;

after removing the instrumentation associated with the at least one selected routine, identifying an indicator that the at least one selected routine has ceased following the respective first pattern of execution, wherein identifying the indicator that the at least one selected routine has ceased following the respective pattern comprises determining that execution time of a higher level routine which calls the at least one selected routine has changed;

in response to identifying the indicator that the at least one selected routine has ceased following the respective first pattern of execution, reinserting the instrumentation associated with the at least one selected routine;

after reinserting the instrumentation associated with the at least one selected routine, receiving respective third performance data for the at least one selected routine over a plurality of execution instances of the instrumented code;

establishing a new respective second pattern of execution for the at least one selected routine based on respective execution times from the respective third performance data of the at least one selected routine after reinserting the instrumentation associated with the at least one selected routine;

after establishing the respective second pattern of execution for the at least one selected routine from the plurality of routines, receiving respective fourth performance data for the at least one selected routine from the plurality of routines;

for the at least one selected routine from the plurality of routines, comparing the respective fourth performance data to the respective second pattern of execution established based on the respective third performance data for the at least one selected routine to determine whether the respective fourth performance data for the at least one selected routine follows the respective second pattern of execution for the at least one selected routine; and in response to determining that the at least one selected routine follows the respective second pattern of execution for the at least one selected routine, removing instrumentation associated with the at least one selected routine.

6. The program product of claim 5, wherein the program instructions are further configured to cause the at least one programmable processor to identify the indicator that the at least one selected routine has ceased following the identified pattern by causing the at least one programmable processor to compare a point in time in which another routine is called by the at least one selected routine to past behavior of the at least the one selected routine.

7. The program product of claim 5, wherein the program instructions are further configured to cause the at least one programmable processor to establish the respective pattern for the at least one selected routine by:
   computing a mean execution time for the at least one selected routine based on the plurality of execution instances;
   determining a respective difference between the mean execution time and each respective execution time of the at least one selected routine corresponding to each execution instance; and
   establishing the respective pattern based on the mean execution time in response to determining that each respective difference is less than a difference threshold.

8. The program product of claim 5, wherein the program instructions are further configured to cause the at least one programmable processor to remove instrumentation associated with the at least one selected routine only if the at least one selected routine is on a code path which meets a predetermined execution criteria for designation as a hot path.

9. An apparatus comprising:
   a storage medium having instrumented code stored thereon, the instrumented code comprising a plurality of routines having respective instrumentation associated with each of the plurality of routines; and
   a processor coupled to the storage medium and configured to execute the instrumented code;
   wherein the processor is further configured to establish a respective first pattern of execution for at least one selected routine from the plurality of routines based on respective execution times from the respective first performance data of the at least one selected routine over a plurality of execution instances of the instrumented code;
   wherein the processor is further configured to gather respective second performance data for the at least one selected routine after establishing the respective first pattern of execution for the at least one selected routine and to determine that the respective second performance data for at least one selected routine of the plurality of routines adheres to the respective first pattern of execution for the at least one selected routine;
   wherein the processor is further configured to remove the respective instrumentation associated with the at least one selected routine in response to determining that the respective second performance data for the at least one selected routine adheres to the respective first pattern of execution;
   wherein the processor is further configured to identify an indicator that the at least one selected routine has ceased adhering to the respective first pattern of execution after the instrumentation associated with the at least one selected routine is removed; and
   wherein the processor is further configured to reinsert the respective instrumentation associated with the at least one selected routine in response to identifying the indicator that the at least one selected routine has ceased adhering to the respective first pattern of execution;
   wherein the processor is further configured to:
   gather respective third performance data for the at least one selected routine over a plurality of execution instances of the instrumented code after reinserting the instrumentation associated with the at least one selected routine;
   establish a new respective second pattern of execution for the at least one selected routine based on respective execution times from the respective third performance data of the at least one selected routine after reinserting the instrumentation associated with the at least one selected routine;
   gather respective fourth performance data for the at least one selected routine from the plurality of routines after establishing the respective second pattern of execution for the at least one selected routine from the plurality of routines;
   for the at least one selected routine from the plurality of routines, compare the respective fourth performance data to the respective second pattern of execution established based on the respective third performance data for the at least one selected routine to determine whether the respective fourth performance data for the at least one selected routine follows the respective second pattern of execution for the at least one selected routine; and
   remove instrumentation associated with the at least one selected routine in response to determining that the at least one selected routine follows the respective second pattern of execution for the at least one selected routine.

10. The apparatus of claim 9, wherein the processor is configured to establish the respective pattern for the at least one selected routine by:
    computing a mean execution time for the at least one selected routine based on the plurality of execution instances;
    determining a respective difference between the mean execution time and each respective execution time of the at least one selected routine corresponding to each execution instance; and
    establishing the respective pattern based on the mean execution time in response to determining that each respective difference is less than a difference threshold.

11. The apparatus of claim 9, wherein the processor is further configured to remove instrumentation associated with the at least one selected routine only if the at least one selected routine is on a code path which meets a predetermined execution criteria for designation as a hot path.

* * * * *